Jan. 19, 1932.   J. R. GAMMETER   1,841,407
RUBBER RING OR BAND AND METHOD FOR MAKING THE SAME
Filed March 20, 1928
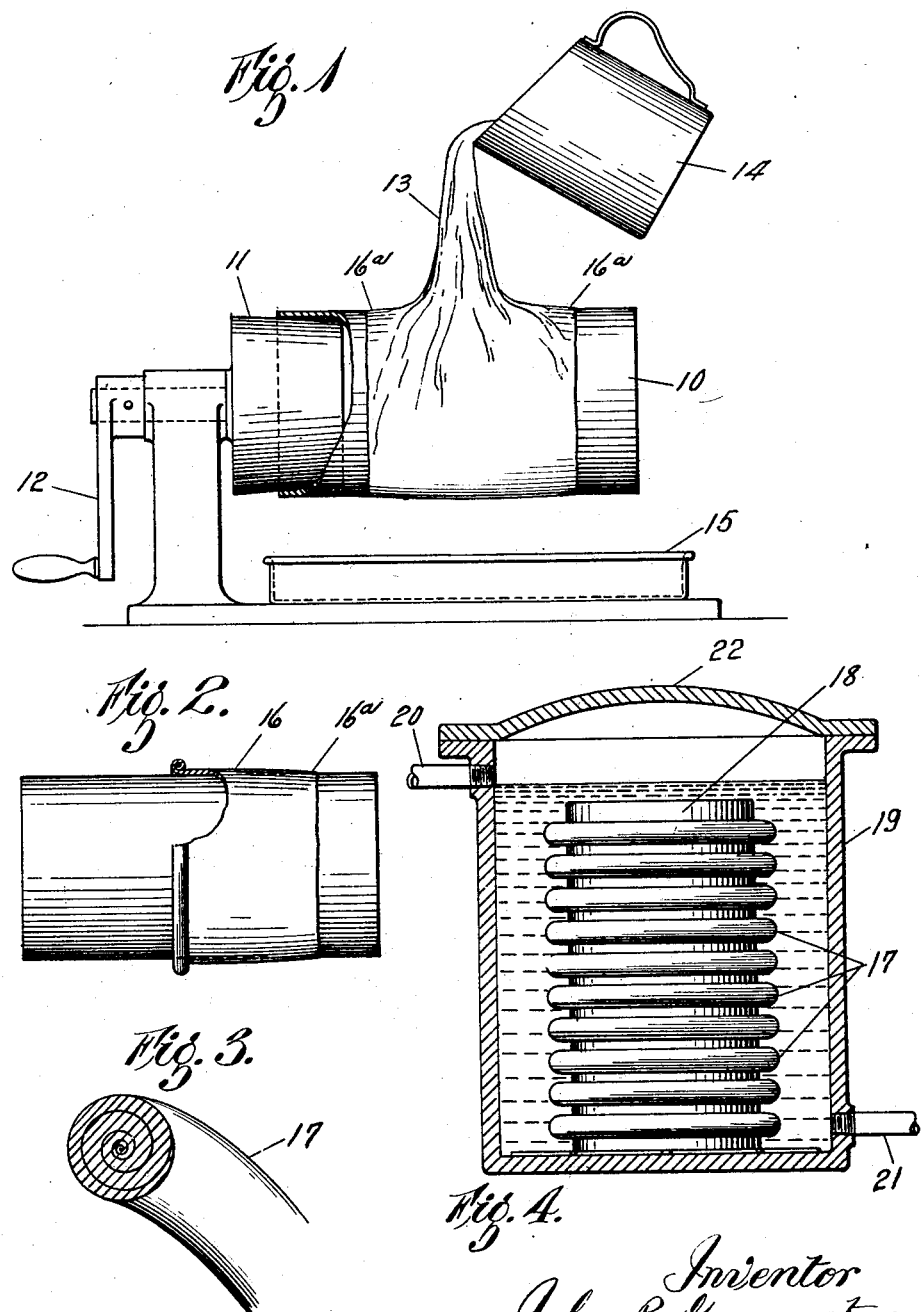

Patented Jan. 19, 1932

1,841,407

UNITED STATES PATENT OFFICE

JOHN R. GAMMETER, OF AKRON, OHIO, ASSIGNOR TO THERMO PROCESS, INC., A CORPORATION OF OHIO

RUBBER RING OR BAND AND METHOD FOR MAKING THE SAME

Application filed March 20, 1928. Serial No. 263,076.

This invention relates to rings or bands of rubber or the like and procedure for making the same.

The general purpose of the present invention is to provide a rubber or like ring or band having a substantially uniform cross-section and smooth exterior surface and free from splices, lumps or knots, and also simple and inexpensive procedure for making the same.

More particularly, the invention has for its objects the provision of a ring or band of rubber or the like consisting of a tube of rubber or the like formed with ends gradually tapering to a feather-edge and rolled upon itself to form a ring and the provision of a method for making said ring comprising the steps of forming the tube such as described above, rolling it upon itself to form the ring and curing or vulcanizing the ring.

The foregoing and other objects of the invention are attained by the ring or band construction and the method illustrated in the accompanying drawings and described below. It is to be understood that the invention is not limited to the particular form thereof illustrated nor to the particular procedure outlined.

Of the accompanying drawings.

Figure 1 illustrates a suitable method for forming a tube of rubber with tapered, feather-edged ends;

Figure 2 illustrates the step of rolling the tube upon itself to form a ring of rubber;

Figure 3 illustrates the ring formed by the method illustrated in Figures 1 and 2; and Figure 4 illustrates a suitable method for vulcanizing said rings.

The preferred procedure for practicing the invention comprises pouring or spraying a dispersion of rubber, such as natural or artificial latices, upon the surface of a rotary drum, preferably heated, to dry or coagulate the latex, the rubber flowing in both directions from the point of pouring or spraying on the surface of the drum, whereby tapered, feather-edged ends are formed on the resulting tube.

This method is illustrated in Figure 1, the numeral 10 designating a suitable drum mounted on a chuck block 11 arranged to be rotated in any suitable way, a crank 12 being shown for this purpose. A thickened or concentrated rubber dispersion 13 or solution preferably containing the usual vulcanizing ingredients to produce strength and elasticity may be poured onto drum 10 from a suitable vessel 14. A drip pan 15 may be provided beneath drum 10. By this procedure, a tube of rubber is obtained on drum 10, the ends of which tube are tapered as indicated at 16ª, 16ª to feather edges.

The next step in the method consists in rolling the tube of raw or unvulcanized rubber upon itself from one end to the other. This may be done by hand or by any of the various bead rolling devices employed in the manufacture of dipped rubber goods. This is illustrated in Figure 2.

As a result of this step of the method, a ring or band 17 of rubber is secured, such as is illustrated in Figure 3, the cross-section of the ring being substantially a perfect circle and being uniform throughout and the exterior surface thereof being substantially smooth, whereby it may be vulcanized by direct application of a curing medium thereto without the use of molds.

The preferred method of vulcanizing the rings or bands 17 is to immerse them in hot water as shown in Figure 4. The rings may be mounted on a drum 18 and immersed in the hot water in a vessel 19 having a supply connection 20 and drain 21. A cover 22 may be provided for vessel 19 to seal it for the application of pressure upon the water, if desired.

The resulting rubber bands will be of round, uniform cross-section, having a smooth exterior surface and will be free from splices, knots or lumps. Because of the uniformity of the band, it will stretch uniformly throughout its circumference and because of its round cross-section, it may be rolled onto an object without twisting.

By curing or vulcanizing the rubber ring while it is on a circular form, either the drum upon which it is rolled, or on a separate curing drum, the circular condition of the rings is preserved. The elasticity and life of the rings is also increased as the tendency of the rings to shrink upon curing is resisted by the drum.

It will be apparent that by the invention, a greatly improved rubber band and a greatly improved procedure for making such bands has been devised. Obviously, modifications of this invention may be resorted to without departing from the spirit thereof or the scope of the appended claims.

What is claimed is:—

1. That method for making rubber rings or bands which comprises pouring a concentrated rubber dispersion on a rotating hot drum to form a tube of rubber with tapered feather-edges, rolling said tube upon itself from one end to the other to form an endless ring or band, and vulcanizing said band under water at a curing temperature and pressure.

2. That method for making rubber rings or bands which comprises pouring rubber in liquid form on a rotating drum to form a tube of rubber with tapered feather-edges, rolling said tube upon itself from one end to the other to form an endless ring or band, and vulcanizing said band under water at a curing temperature.

3. That method of making a rubber band comprising applying rubber in liquid form to a rotating drum to form a tube with tapered ends, rolling said tube upon itself to form an endless ring, and vulcanizing said ring.

4. That method of making a rubber band comprising forming a tube of unvulcanized rubber with tapered ends, rolling said tube of rubber upon itself to form an endless ring, and vulcanizing said ring.

5. That method of making a rubber band comprising forming a thin tube of unvulcanized rubber with ends tapered to feather-edges, rolling said tube upon itself to form a ring, and vulcanizing said ring.

6. That method of making endless rubber rings, which comprises depositing rubber from a liquid onto a drum to form a tube open at both ends, and rolling said tube upon itself from one end to the other.

JOHN R. GAMMETER.